May 6, 1930. P. GOEBELS 1,757,832
CONVEYER
Filed Oct. 15, 1926

Inventor
Paul Goebels
by
Attorney.

Patented May 6, 1930

1,757,832

UNITED STATES PATENT OFFICE

PAUL GOEBELS, OF DESSAU, GERMANY, ASSIGNOR TO THE FIRM G. POLYSIUS, OF DESSAU, GERMANY, A PARTNERSHIP

CONVEYER

Application filed October 15, 1926, Serial No. 141,817, and in Germany May 18, 1926.

In the known constructions of conveying apparatus, in which a conveyer worm serves for the conveyance of flour-like goods in large quantity, the conveyer worm rotating in the casing of the conveying apparatus is made in one piece with its driving shaft or is rigidly welded to said shaft. The consequence thereof is, that, when the worm is to be exchanged, this being frequently the case on account of the great wear, the apparatus as a whole must be taken apart. Practice has shown that the wear of the worm occurs very often when sharp goods, for instance cement, is conveyed and accordingly the dismounting of the whole apparatus must frequently take place, this causing every time a longer standstill of operation and heavy expenses. Practice has further shown, that, when foreign bodies, for instance iron particles, are present in the conveying apparatus and gripped by the worm, which is rigidly connected to the shaft, a large portion of the apparatus will break down.

This drawback is obviated by the present invention by making the conveyer worm proper in one piece with a tube in such a manner, that said tube together with the worm is loosely mounted on the hollow shaft and driven by a special catching device.

In the operation of such conveying apparatus it has been found further, that immediately behind the conveyer worm strong whirls arise in the conveying tube conduit. These whirls are produced especially at that point, where the goods advanced by the conveyer worm meets with the entering compressed air which is frequently employed in connection with the conveyer screw. Naturally said whirls are very detrimental and annoying for the smooth conveyance of the goods. At this place very easily a stoppage or even a complete stowing of the goods to be conveyed may take place, so that the conveyance will temporarily be entirely interrupted and large quantities of goods will be lost unnecessarily.

By the present invention this drawback is obviated by reducing the diameter of the conveying tube conduit at the dangerous place behind the conveyer worm. The place on which in a smooth, unrestricted conduit the whirls arise, has a different position in regard to the conveyer worm and depends on the kind, the weight and the quantity of the goods to be conveyed.

Figure 1:
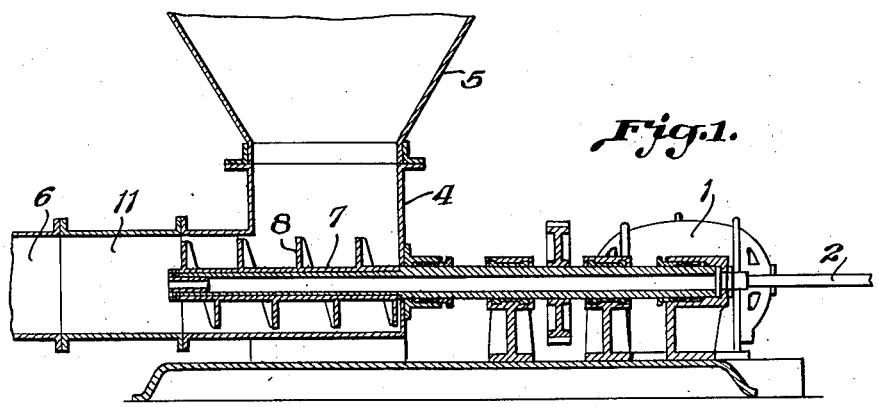
Figure 2:
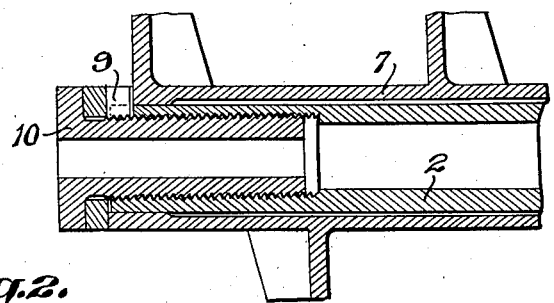
Figure 3:
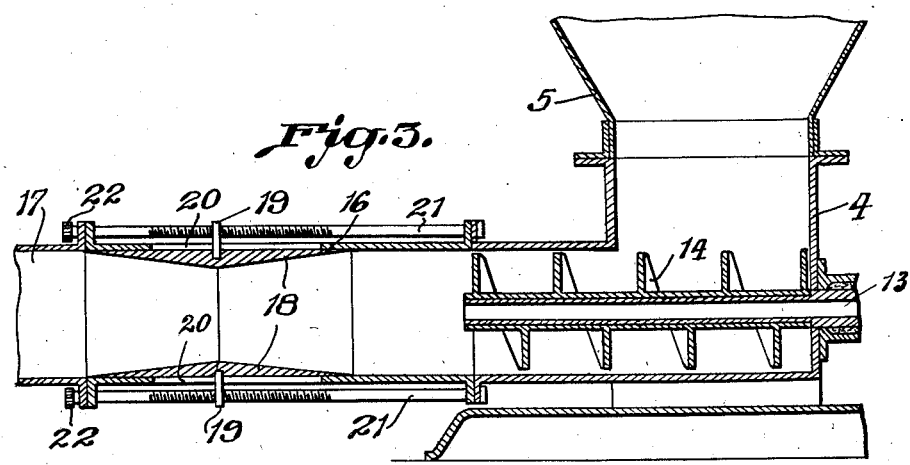

In the accompanying drawing, in which one form of construction of my invention is illustrated, Fig. 1 is a diagrammatical view, partly section of my improved conveying apparatus, Fig. 2 is a detail view of the conveyer worm and the catching device, while Fig. 3 shows means for producing an adjustable reduction of the diameter of the conveying tube conduit.

In the drawing 1 indicates the driving motor and 2 the worm shaft, which is hollow and may be connected in the known manner to a compressed air feeding tube. 4 indicates the casing of the conveying apparatus, into which the goods to be conveyed are introduced through the funnel 5 in the known manner to the conveying tube conduit 6, through which the goods to be conveyed are driven by means of the conveyer worm and eventually by compressed air to the point of delivery or consumption. On the hollow conveyer worm shaft 2 is pushed loosely the tube 7 having the worm threads 8, said tube and the worm threads being made from suitable material. At the end of the tube 7 catching cams 9 are provided, which engage with corresponding counter cams of the catching device 10. The latter is rigidly connected to the hollow shaft by means of screwing, as indicated in Fig. 2, and accordingly carries along the loosely mounted worm tube, when the shaft is rotated. The catching cams of the catching device 10 are constructed in such a manner, that they serve as safety breaking devices, that means in case foreign bodies appear in the conveying apparatus, said cams are caused to break and the worm then comes to a standstill, while the shaft, driven by the motor, continues to rotate. By this construction greater damages are avoided and an exchange of the conveyer worm can be effected in a simple manner. After the removal of the tube part 11 and the loosening of the catching device the worm conveyer 7 and 8 may be drawn out and replaced by a new one.

In Fig. 3 the reference numeral 4 indicates the casing of the known conveying apparatus, into which the shaft 13 with the conveyer worm 14 projects. Compressed air may be supplied to the conveying tube conduit through the hollow shaft 13, while the goods to be conveyed are introduced into the conveying apparatus through the funnel 5, the same as in the construction according to Fig. 1. 16 indicates the front end of the conveying tube conduit and 17 the continuation of said conduit. Within the tube part 16 the slidably arranged reducing tube 18 is provided, which restricts the cross sectional area of the tube conduit in the desired degree. The reducing tube 18 is connected by brackets 19, which are guided in lateral slots 20 of the tube part 16, to the spindles 21 and may be displaced from the outside by turning the handwheels 22, so that the restricted part of the tube conduit can be approached to or removed from the end of the conveyer worm.

I claim:

A worm conveyer for flour-like material, said conveyer comprising in combination, a driving shaft, a tube permanently connected with a conveyer worm, said tube together with said worm being adapted to be loosely pushed over said driving shaft, a conveying tube conduit arranged closely behind the end of said conveyer worm, a tube of reduced cross-sectional area mounted within said conveying tube, and means for adjusting said tube of reduced cross-sectional area longitudinally within said conveying tube.

In testimony whereof I affix my signature.

PAUL GOEBELS.